US008532002B1

(12) United States Patent
Zats et al.

(10) Patent No.: US 8,532,002 B1
(45) Date of Patent: Sep. 10, 2013

(54) SELF MANAGING A LOW POWER NETWORK

(75) Inventors: Yuri Zats, Menlo Park, CA (US); Kristofer S. J. Pister, Orinda, CA (US); William Alan Lindsay, El Cerrito, CA (US); Lance R. Doherty, Berkeley, CA (US)

(73) Assignee: Dust Networks, Inc., Hayward, CA (US)

( * ) Notice: Subject to any disclaimer, the term of this patent is extended or adjusted under 35 U.S.C. 154(b) by 769 days.

(21) Appl. No.: 11/256,652

(22) Filed: Oct. 20, 2005

Related U.S. Application Data (60) Provisional application No. 60/634,195, filed on Dec. 7, 2004.

(51) Int. Cl.
*G08C 17/00* (2006.01)

(52) U.S. Cl.
USPC ........................................................ 370/311

(58) Field of Classification Search
USPC .............. 370/241.1, 252, 254, 311; 709/223, 709/224; 379/32.01
See application file for complete search history.

(56) References Cited

U.S. PATENT DOCUMENTS

| | | | | |
|---|---|---|---|---|
| 5,572,195 A * | 11/1996 | Heller et al. | ............. | 340/825.49 |
| 5,799,317 A * | 8/1998 | He et al. | ...................... | 707/104.1 |
| 6,072,784 A * | 6/2000 | Agrawal et al. | ............... | 370/311 |
| 6,167,448 A * | 12/2000 | Hemphill et al. | ............. | 709/224 |
| 6,584,330 B1 * | 6/2003 | Ruuska | ........................ | 455/574 |
| 6,973,034 B1 * | 12/2005 | Natarajan et al. | ............. | 370/232 |
| 7,035,240 B1 * | 4/2006 | Balakrishnan et al. | ....... | 370/338 |
| 7,228,421 B1 * | 6/2007 | Huang et al. | .................. | 713/171 |
| 2003/0063585 A1 * | 4/2003 | Younis et al. | .................. | 370/331 |
| 2003/0063619 A1 * | 4/2003 | Montano et al. | .............. | 370/443 |
| 2003/0158609 A1 * | 8/2003 | Chiu | ............................... | 700/22 |
| 2004/0090943 A1 * | 5/2004 | da Costa et al. | .............. | 370/338 |
| 2004/0116141 A1 * | 6/2004 | Loven et al. | .................. | 455/519 |
| 2004/0125776 A1 * | 7/2004 | Haugli et al. | ................. | 370/338 |
| 2004/0153676 A1 * | 8/2004 | Krantz et al. | ................. | 713/300 |
| 2004/0192218 A1 * | 9/2004 | Oprea | ............................. | 455/73 |
| 2004/0204071 A1 * | 10/2004 | Bahl et al. | ..................... | 455/557 |
| 2004/0209610 A1 * | 10/2004 | Adwankar et al. | ............. | 455/419 |
| 2005/0005304 A1 * | 1/2005 | Kaul et al. | ..................... | 725/118 |
| 2005/0044432 A1 * | 2/2005 | Park | ............................. | 713/300 |
| 2005/0058084 A1 * | 3/2005 | Hester et al. | .................. | 370/254 |
| 2005/0080894 A1 * | 4/2005 | Apostolopoulos et al. | ... | 709/224 |
| 2005/0159106 A1 * | 7/2005 | Palin et al. | ..................... | 455/41.2 |
| 2005/0177639 A1 * | 8/2005 | Reunamaki et al. | .......... | 709/227 |
| 2006/0019679 A1 * | 1/2006 | Rappaport et al. | ......... | 455/456.5 |
| 2006/0050742 A1 * | 3/2006 | Grandhi et al. | ............... | 370/506 |
| 2006/0064283 A1 * | 3/2006 | Saidi et al. | .................... | 702/183 |

(Continued)

OTHER PUBLICATIONS

Patrick Kinney, "ZigBee Technology: Wireless Control that Simply Works," Oct. 2, 2003, Communications Design Conference, p. 1-20.*

*Primary Examiner* — Dang Ton
*Assistant Examiner* — Ryan Kavleski
(74) *Attorney, Agent, or Firm* — McDermott Will & Emery LLP (57) ABSTRACT

Self managing a low power network is disclosed. A packet is received which includes network information and it is determined if a management action is required based at least in part on information in the packet. In the event that management action is required, the management action is performed wherein the management action is determined based at least in part on information in the packet.

28 Claims, 11 Drawing Sheets

(56) References Cited

U.S. PATENT DOCUMENTS

| | | | |
|---|---|---|---|
| 2006/0088042 A1* | 4/2006 | Shoham et al. | 370/401 |
| 2006/0121951 A1* | 6/2006 | Perdomo et al. | 455/572 |
| 2007/0230421 A1* | 10/2007 | Roadknight | 370/338 |

* cited by examiner

SELF MANAGING A LOW POWER NETWORK

CROSS REFERENCE TO OTHER APPLICATIONS

This application claims priority to U.S. Provisional Patent Application No. 60/634,195 entitled LOW-POWER DIGRAPH NETWORK SYSTEM filed Dec. 7, 2004 which is incorporated herein by reference for all purposes.

BACKGROUND OF THE INVENTION

Networks are made up of a plurality of nodes that are organized to communicate with each other. The organization and operation of the nodes typically involves network management personnel to perform tasks for the setup and maintenance of the network. These tasks grow in number as the network nodes grow in number. It would be useful if the network could monitor itself and take actions in order to manage itself without involving network management personnel.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Self managing a low power network is disclosed. A health packet is received. Based at least in part on information in the health packet, it is determined if a management action is required. In the event that management action is required, the management action is performed wherein the management action is determined based at least in part on information in the health report packet. In some embodiments, a health report packet is sent from a node in a low power network to a manager node. The manager node determines if a management action is required. In various embodiments, determining if the management action is required includes calculating an expected battery lifetime and determining if the expected battery lifetime is below a prescribed threshold, calculating a network statistic and determining if it is time to display the network statistic, calculating a network statistic and determining if the network statistic indicates a network problem, and/or determining if information received is about a new network node. In various embodiments, performing the management action includes notifying by email or on a user display, changing the network organization by changing routing, changing superframes, and/or changing node parameters.

Figure 1:
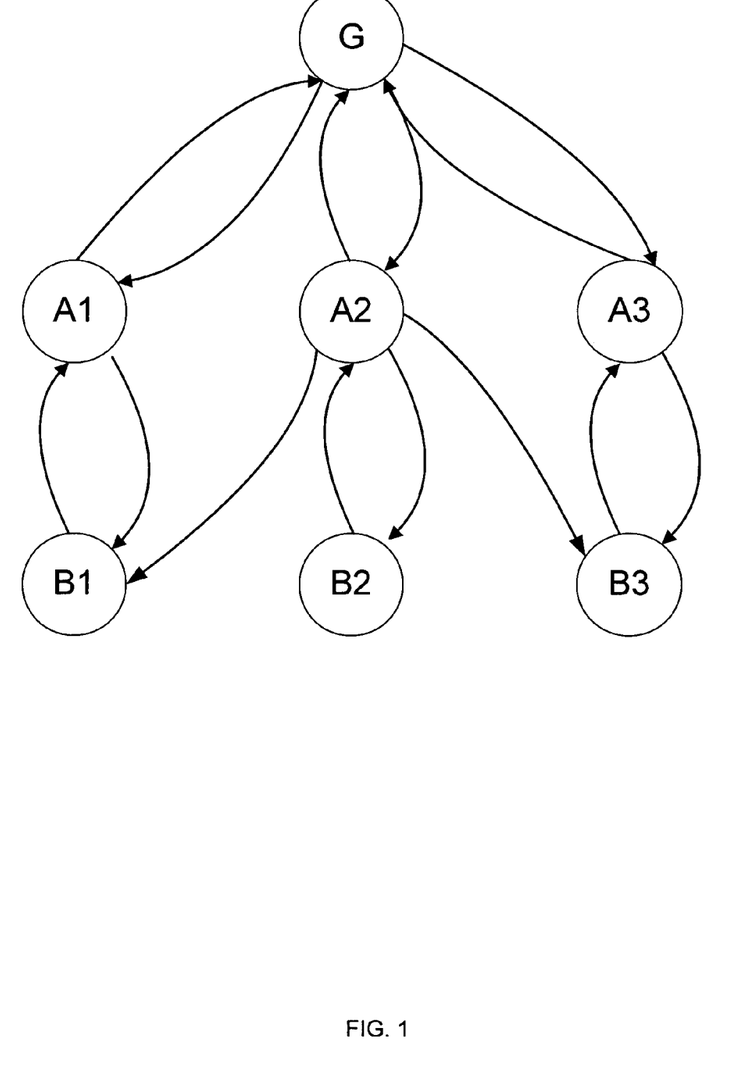
FIG. 1 is a block diagram illustrating an embodiment of a low power network.

FIG. 1 is a block diagram illustrating an embodiment of a low power network. In the example illustrated, the network is a low power digraph network. Digraph networks employ nodes comprising a transmitter and receiver, a power source, input devices, sometimes output devices, and an intelligent controller, such as a programmable microprocessor controller with memory. Digraph nodes are connected to each other with communication links. The links indicate the direction of transmission of packets. In some embodiments, there is communication in the opposite direction of the link in order to acknowledge, or not acknowledge, the proper receipt of a packet after it has been transmitted. Gateway node G is linked to node A1, node A2, and node A3. Node A1 is linked to node G and to node B1. Node A2 is linked to node G, node B1, node B2, and node B3. Node A3 is linked to node G and node B3. Node B1 is linked to node A1. Node B2 is linked to node A2. Node B3 is linked to node A3. In some embodiments, gateway node G is a manager node.

Figure 2:
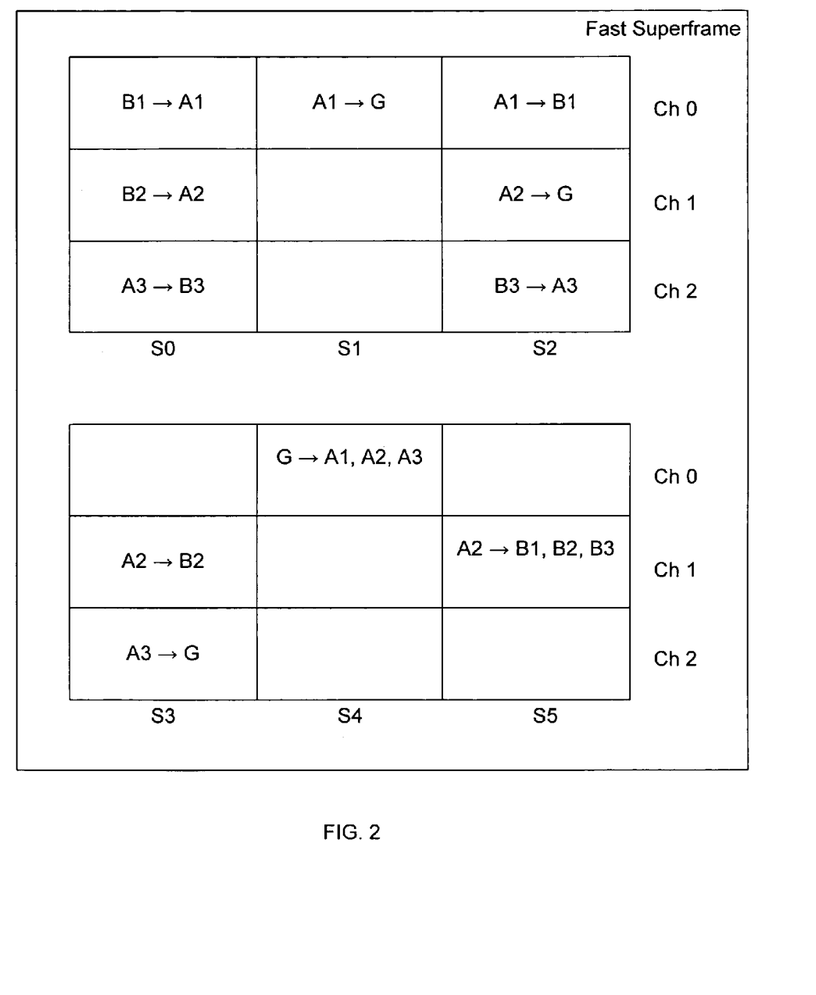
FIG. 2 illustrates a superframe corresponding to the digraph network of FIG. 1 in one embodiment.

FIG. 2 illustrates a superframe corresponding to the digraph network of FIG. 1 in one embodiment. In the example illustrated, communication between nodes, described by a superframe, occurs only at specific times and on specific channels (for example, a time division multiple access system). Each node in a network represents its connectivity to other nodes in the network as a collection of directed links on one or more digraphs. Each superframe repeats in a continuous sequence of cycles. Each link can be used for the transmission and optional acknowledgement of a single packet. The fast superframe containing three channels is shown: channel 0 (Ch 0), channel 1 (Ch 1), and channel 2 (Ch 2). The superframe also contains nine time slots: slot 0 (S0), slot 1 (S1), slot 2 (S2), slot 3 (S3), slot 4 (S4), and slot 5 (S5). In the example illustrated, in Ch 0-S0 cell, node B1 sends to node A1. In Ch 1-S0 cell, node B2 sends to node A2. In Ch 2-S0 cell, node A3 sends to node B3. In Ch 0-S1 cell, node A1 sends to node G. In Ch 0-S2 cell, node A1 sends to node B1. In Ch 1-S2 cell, node A2 sends to node G. In Ch 2-S2 cell, node B3 sends to node A3. In Ch 1-S3 cell, node A2 sends to node B2. In Ch 2-S3 cell, node A3 sends to node G. In Ch 0-S4 cell, node G sends to nodes A1, A2, and A3. In Ch 1-S5 cell, node A2 sends to nodes B1, B2, and B3.

In some embodiments, the fast superframe is used for reliable broadcast of messages. These broadcast messages have an identifier (sequence number) in the packets for indicating that the broadcast message is addressed to all nodes and is acknowledged by all nodes to the manager node. In various embodiments, the superframe is used for manipulating (changing or building) a superframe in the network, manager resets of the network, building the network, when a new node appears, when the manager's queue is too large, when a node has disappeared to attempt to hear it so that it can rejoin, and/or when uploading new software to the nodes.

Figure 3:
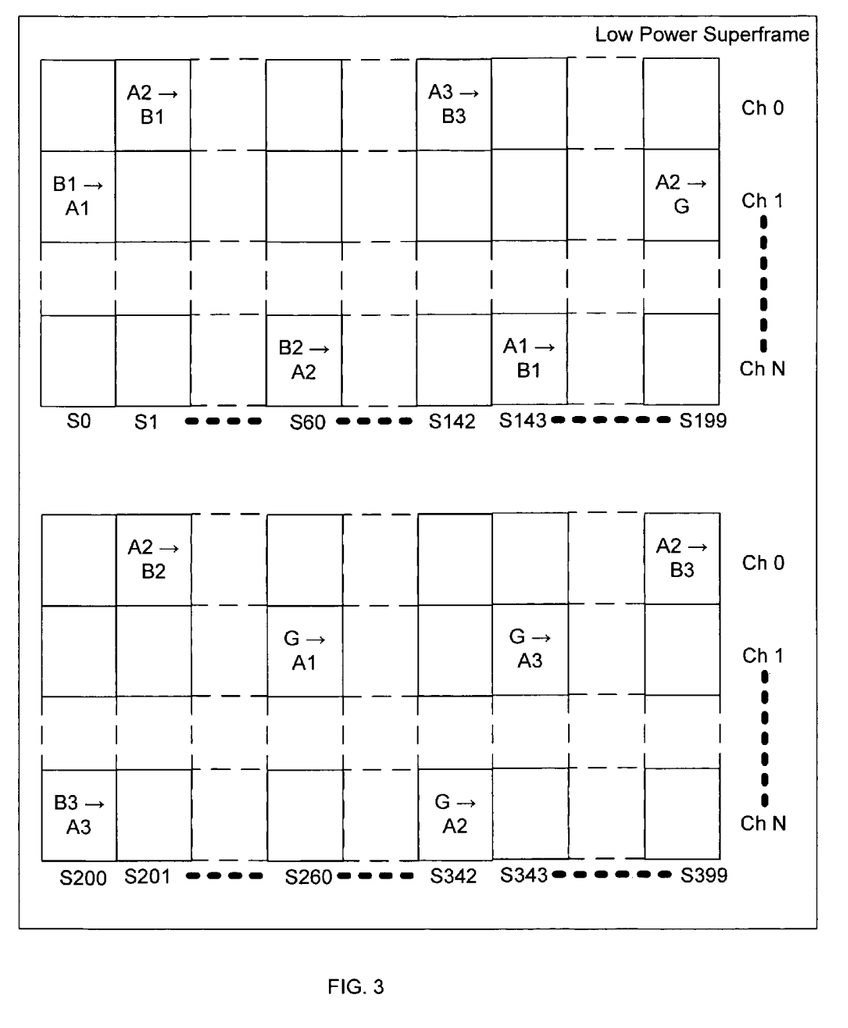
FIG. 3 illustrates a superframe corresponding to the digraph network of FIG. 1 in one embodiment.

FIG. 3 illustrates a superframe corresponding to the digraph network of FIG. 1 in one embodiment. Low power superframe contains N channels (represented by Ch 0, Ch 1, and Ch N) and 400 time slots (represented by S0, S1, S60, S142, S143, S199, S200, 5201, 5260, S342, 5343, and S399). In Ch 1-S0 cell, node B1 sends to node A1. In Ch 0-S1 cell, node A2 sends to node B1. In Ch N-S60, node B2 sends to node A2. In Ch 0-S142 cell, node A3 sends to node B3. In Ch N-S143 cell, node A1 sends to node B1. In Ch 1-S199 cell, node A2 sends to node G. In Ch 1-S200 cell, node A1 sends to node B1. In Ch N-S200 cell, node B3 sends to node A3. In Ch 0-S201 cell, node A2 sends to node B2. In Ch N-S201 cell, node A1 sends to node G. In Ch 1-S260 cell, node G sends to node A1. In Ch N-S342 cell, node G sends to node A2. In Ch 1-S343 cell, node G sends to node A3. In Ch 0-S399 cell, node A2 sends to node B3. In Ch N-S399 cell, node A3 sends to node G.

In some embodiments, the fast superframe and the low power superframe are activated and deactivated at appropriate times for network functionality. In various embodiments, the fast superframe is triggered by a manager node, any other node, an event, and/or a new node.

Figure 4A:
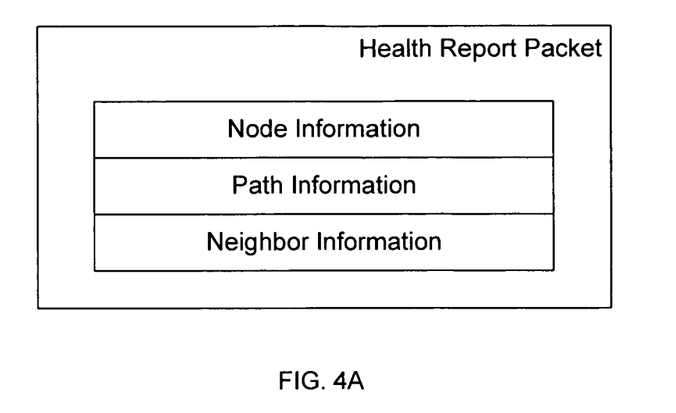
FIG. 4A illustrates an embodiment of a health report packet.

FIG. 4A illustrates an embodiment of a health report packet. In the example shown, the health report packet includes node information, path information, and neighbor information. Node information includes information regarding a particular node. For example, node information includes identifying information—such as a sequence number, source, destination, time stamp, hop counter; packet statistics—such as successful and failed packets transmitted and received; queue information—such as latency and length; and battery related information—such as voltage and node temperature. In some embodiments, there are several different types of health report packets—for example, health report packets that contain some or all of the information about network states. In various embodiments, health report packets are generated periodically, on request, or based on a condition (for example, queue overflow, low battery, long latency, low signal strength of neighbor, etc.). In some embodiments, the manager asks for health reports from all nodes in the network, a single node, or a subset of nodes. In some embodiments, a health report packet contains information regarding an alarm sent by a node. In some embodiments, an alarm packet contains health report information that can be used to trigger network management action.

Figure 4B:
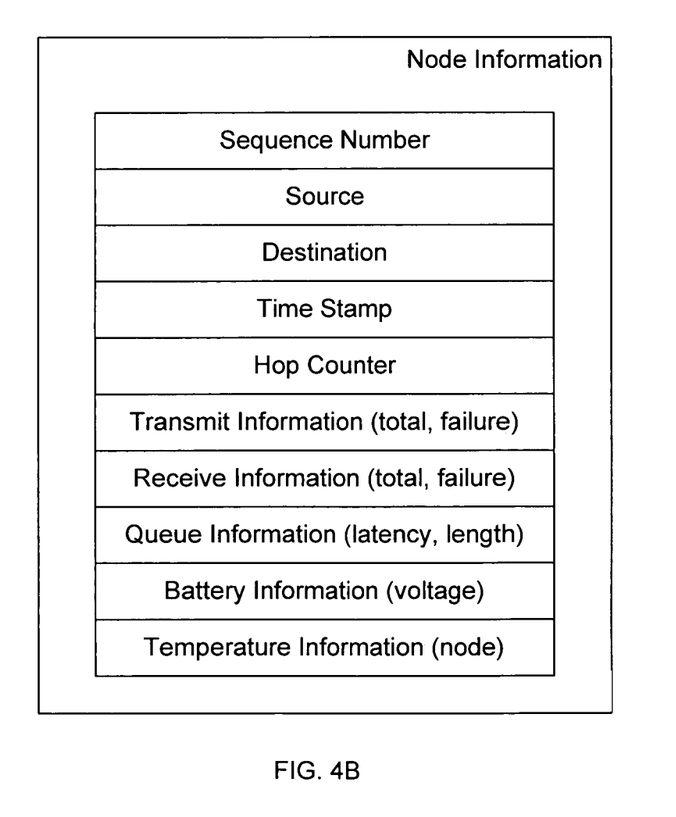
FIG. 4B illustrates an embodiment of node information.

FIG. 4B illustrates an embodiment of node information. In the example shown, node information includes sequence number, source node, destination node, time stamp relating to the time the packet was originally sent, and hop counter indicating the number of hops that the packet has taken. Node information also includes transmit information (for example, the number of packets successfully sent and the number of packets that failed when being sent), receive information (for example, the number of packets successfully received and the number of packets that failed when being received), queue information (for example, the average length of the queue on the node and the average time that a packet waited before being sent), the battery voltage, and the node temperature. Transmission failure occurs when an explicit NACK (a negative acknowledge message) or no ACK (acknowledge message) is received. Receive failure occurs when there is a parity check failure on a received message or when the message does not fit in the buffer (the buffer overruns).

In some embodiments, the sequence number is used to identify the originating node by being in a certain range of values. In some embodiments, the sequence number is used to determine if any packets were lost by examining the sequence numbers of the received packets from a given node and checking if there were any gaps in the sequence numbers.

Figure 5A:
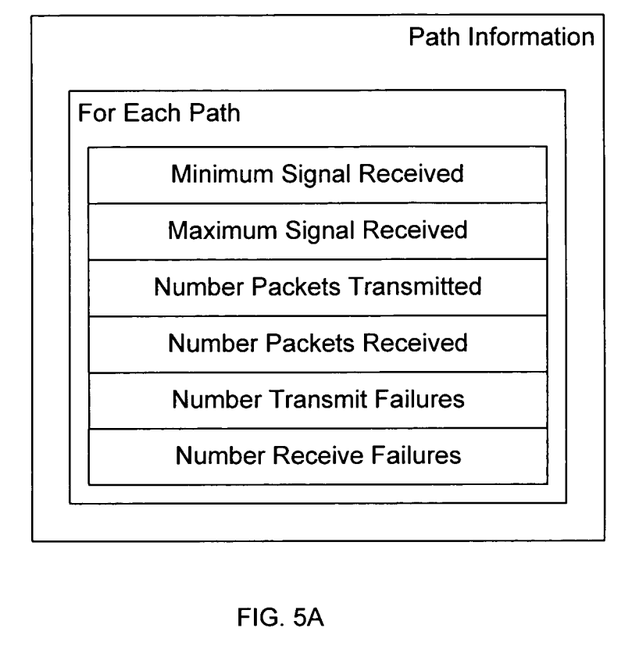
FIG. 5A illustrates an embodiment of path information.

FIG. 5A illustrates an embodiment of path information. In the example shown, path information includes for each path minimum and maximum signal received, number of packets received and transmitted along path, and number of transmit and receive failures along path. In some embodiments, path information is used to determine if a path is functioning properly. For example, if the signal received is not sufficient to have good transmission and reception for the path, then the path can be eliminated or the nodes adjusted to optimize performance. Also, the number of transmissions/receptions and the number of failures can indicate whether a path is functioning properly. The path can be eliminated, or the nodes at either end of the path (or the connectivity to the path) can be altered to optimize performance.

Figure 5B:
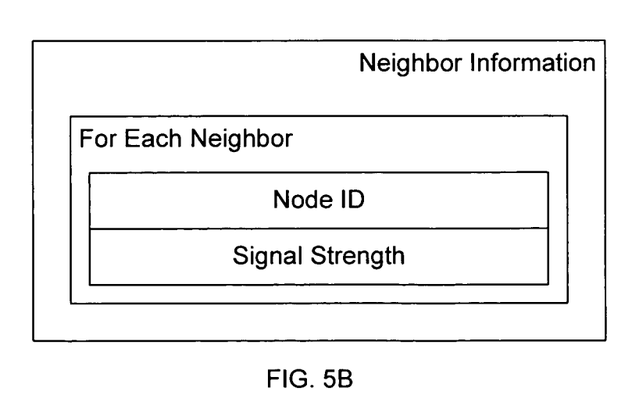
FIG. 5B illustrates an embodiment of neighbor information.

FIG. 5B illustrates an embodiment of neighbor information. In the example shown, neighbor information includes for each neighbor node identifier (ID) and signal strength received from neighbor. In some embodiments, neighbor information is regarding new neighbors. In some embodiments, when a new node is placed in the network environment, the node first listens to traffic, checks to make sure that it is listening to the appropriate network, synchronizes to the network, and informs network of its presence. The node also hears its network neighbors and establishes stronger candidates for links. Information is then sent to the manager of the network regarding its neighbors and its own properties including hardware and software descriptions. The manager node can activate the new node to be a part of the network by sending relevant parameters to the node and other nodes in the network.

Figure 6:
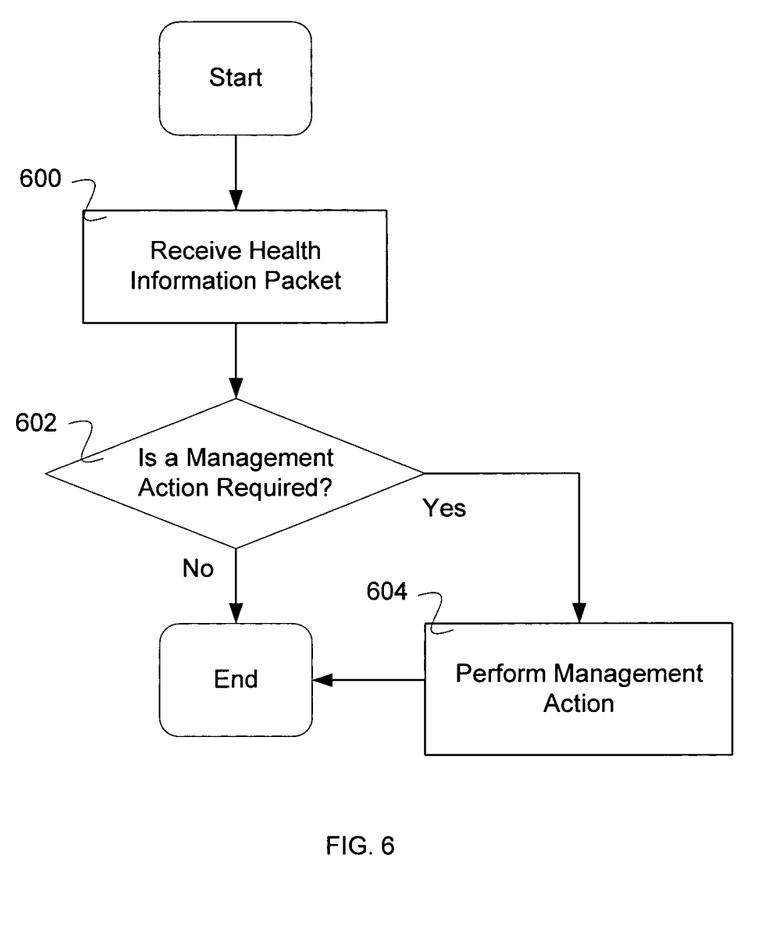
FIG. 6 is a flow diagram illustrating an embodiment of a process for self managing a low power network.

FIG. 6 is a flow diagram illustrating an embodiment of a process for self managing a low power network. In the example shown, in 600 a health packet is received. In 602, it is determined if a management action is required. If a management action is required, then in 604 a management action is performed. If a management action is not required, the process ends. In various embodiments, a determination of whether or not a management action is required is based at least in part on a lack of health packets being received, an alarm packet coming from a node, a node joining and/or leaving the network, calculated statistics based on data packets received from the network (for example, reliability of links in the network), time to live information derived from packets in the network, or any other appropriate basis for determining if a management action is required.

Figure 7:
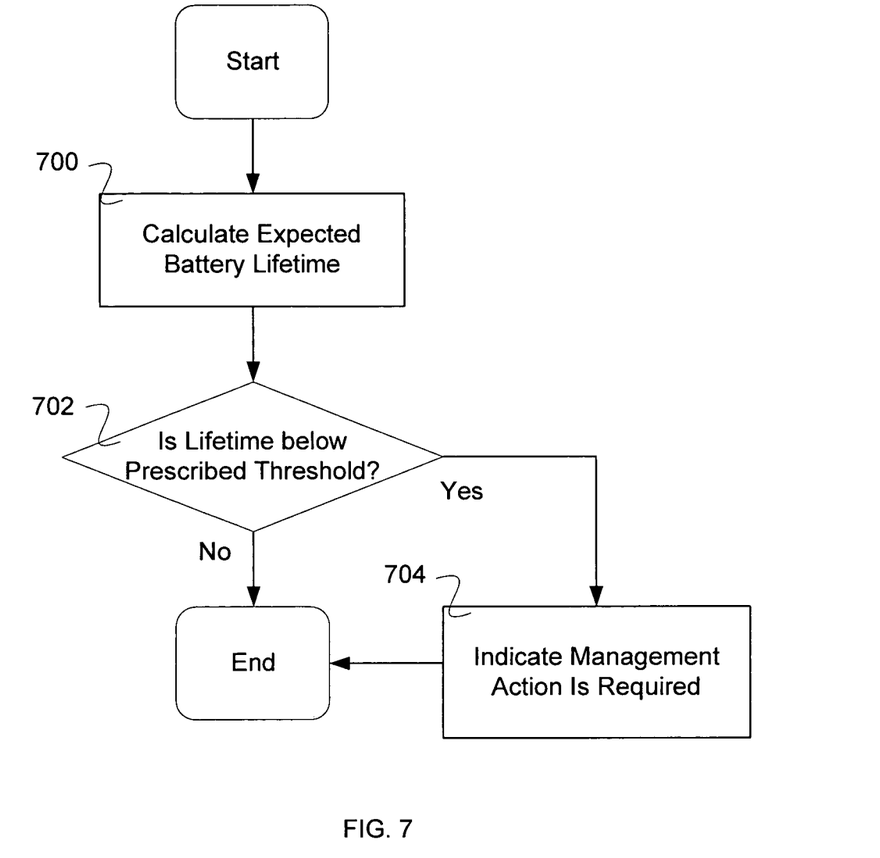
FIG. 7 is a flow diagram illustrating an embodiment of a process for determining if a management action is required.

FIG. 7 is a flow diagram illustrating an embodiment of a process for determining if a management action is required. In the example shown, in 700 an expected battery lifetime is calculated. In 702, it is determined if the expected battery lifetime is below a prescribed threshold. If the expected battery lifetime is below a prescribed threshold, then in 704 it is indicated that a management action is required. If a management action is not required, the process ends. In some embodiments, the management action includes issuing a battery warning where the warning may be issued via email, a warning displayed for a user on a graphical user interface, or any other appropriate manner of issuing a warning. In some embodiments, the management action includes changing network organization to reduce battery use. For example, node connectivity can be altered so that the node is lower in the mesh or so that the node is away from paths where it will not act as a throughway to the gateway, changing superframe configuration or usage, or any other appropriate change to network organization that enables reduced battery usage for a node. In some embodiments, the management action includes changing a network node parameter to reduce battery use, changing a battery, and/or adding a node. For example, the node can lower the number of transmit or receive windows or lower the frequency of other power consuming functions such as making measurements, etc. or any other appropriate parameter change enabling reduction in battery use.

Figure 8:
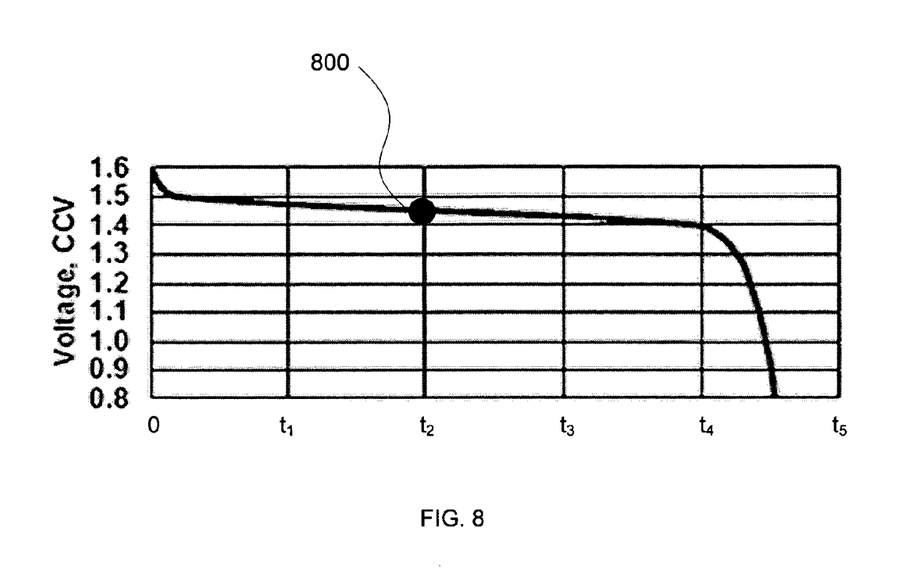
FIG. 8 is a graph illustrating a battery voltage curve in one embodiment.

FIG. 8 is a graph illustrating a battery voltage curve in one embodiment. In the example shown, battery voltage is graphed as a function of time. Calculating an estimated battery lifetime can be achieved by using the reported battery voltage and, using the graph, estimating the time to failure. For example, if the battery voltage is approximately 1.45 V (see point 800), it is likely that the battery has used up $t_2$ of its estimated lifetime. It can also be estimated that the voltage of the battery will begin to drop according to the curve after $t_4$, which would be in a period of time of approximately $(t_4-t_2)$. In various embodiments, a curve fitting, a table lookup, or any other appropriate method is used to estimate the estimated battery lifetime. In some embodiments, the estimated the battery lifetime based at least in part on the temperature of the node or the average temperature of the node. In various embodiments, the estimated battery lifetime is estimated using temperature and battery voltage using curve fitting on a temperature selected curve, table lookup using a table based on the temperature, or any other appropriate method for calculating the estimated battery lifetime. In some embodiments, calculating the estimated battery lifetime is based at least in part on how much communication the node is performing over radio and on the connectivity of the node (the number of links to and from its neighbors), which determines a baseline for radio usage. In some embodiments, past statistics are used to extrapolate future performance of the node and usage of the radio; for example statistics are evaluated every 24 hours per node to determine the estimated battery lifetime.

Figure 9:
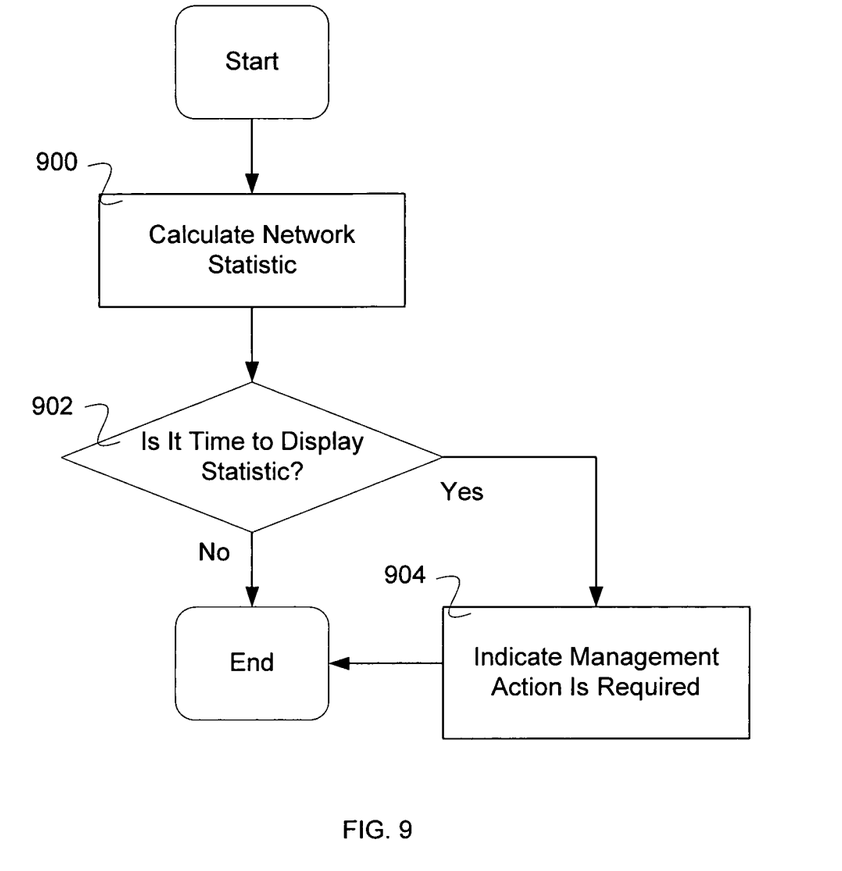
FIG. 9 is a flow diagram illustrating an embodiment of a process for determining if a management action is required.

FIG. 9 is a flow diagram illustrating an embodiment of a process for determining if a management action is required. In the example shown, in 900 a network statistic is calculated. In 902, it is determined if it is time to display the network statistic. If it is time to display the network statistic, then in 904 it is indicated that a management action is required. If a management action is not required, the process ends. In some embodiments, the management action includes issuing a status report. The status report can include statistics such as number of packets transmitted, number of packet received, number of transmission failures, number of receive failures, number of node joins, percentage packets successfully received at the gateway node, percentage packets successfully transmitted/received along a path, and average time it takes to travel from a given node to the gateway node. In some embodiments, the statistics are aggregates of the statistics over a period of time—for example, statistics are aggregated or calculated over 15 minute periods, over 24 hour periods, over a week, or over all time since the start of network operation.

Figure 10:
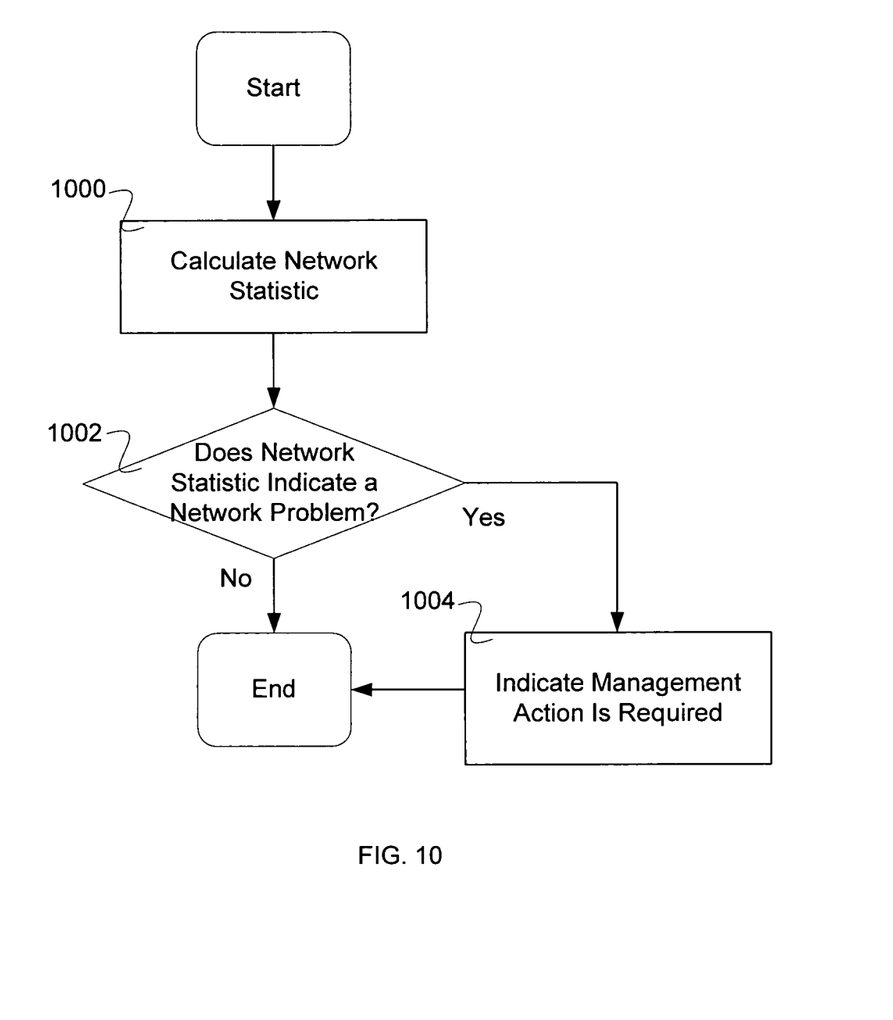
FIG. 10 is a flow diagram illustrating an embodiment of a process for determining if a management action is required.

FIG. 10 is a flow diagram illustrating an embodiment of a process for determining if a management action is required. In the example shown, in 1000 a network statistic is calculated. In 1002, it is determined if the network statistic indicates a network problem. If it there is a network problem, then in 1004 it is indicated that a management action is required. In some embodiments, the network problem is that the network is not optimized—for example, organization, latency, battery lifetime can be improved. In some embodiments, an improvement is a more reliable network, lower queue latency, lower queue size, lower number of hops to the gateway, longer battery life, or any improvement in a quality of service measure or network performance. In various embodiments, latency, power use, reliability, or any combination of these or other parameters are improved to help optimize the network. In some embodiments, the priority of parameters used for optimization is selected by a user, network manager, or other appropriate selector—for example, if latency is optimized for the network, then it should be noted that power efficiency may not also be optimized. If a management action is not required, the process ends. In various embodiments, a network problem includes when transmit failures (or average transmit failures) are above a prescribed threshold, when receive failures (or average receive failures) are above a prescribed threshold, when queue latency (or average queue latency) is above a prescribed threshold, when queue length (or average queue length) is above a prescribed threshold, when signal strength (or average signal strength) is below a prescribed threshold. In some embodiments, the management action includes issuing a network problem warning such as a warning issued by email, by display on a graphical user interface, or any other appropriate manner of issuing a warning. In some embodiments, the management action includes changing network organization to address the network problem. For example, node connectivity can be altered so that paths that are not operating well are not used, other paths are created, more nodes added, or more links are added; superframe configuration or usage can be changed; or any other appropriate change to network organization that addresses the network problem. In some embodiments, the management action includes changing a network node parameter to address the network problem. For example, the node scheduling can be changed, power usage can be altered, or any other appropriate parameter change to address the network problem.

Figure 11:
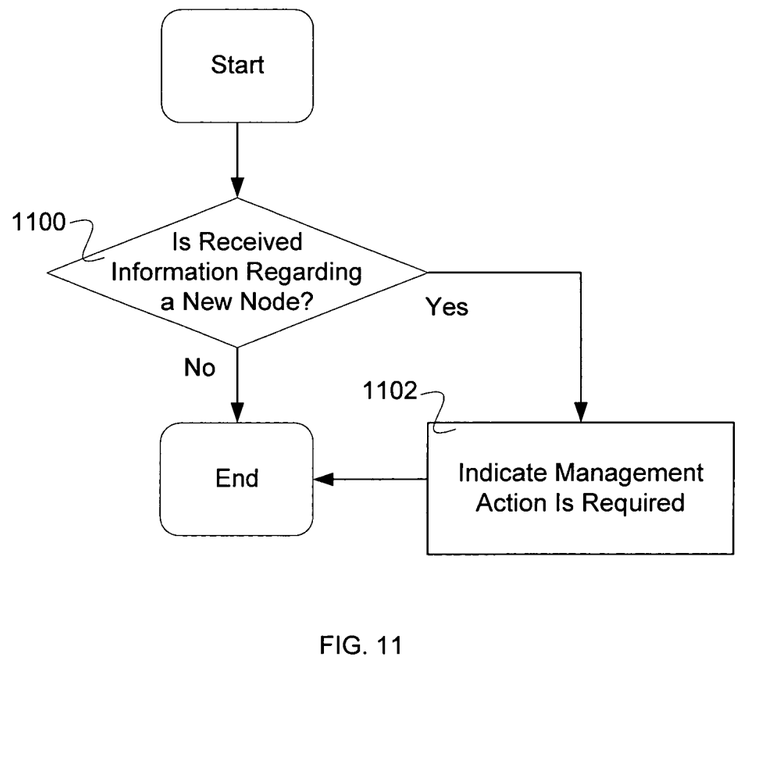
FIG. 11 is a flow diagram illustrating an embodiment of a process for determining if a management action is required.

FIG. 11 is a flow diagram illustrating an embodiment of a process for determining if a management action is required. In the example shown, in 1100 it is determined if the received information is regarding a new node. If there is network problem, then in 1102 it is indicated that a management action is required. If a management action is not required, the process ends. In some embodiments, the management action includes activating the new network node. For example, activating the new network node can include changing a superframe to include communication links with the new node, programming the new node, informing other nodes of the new node, etc.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for self managing a mesh network including a manager node and a plurality of network nodes, the method comprising:
   receiving in the manager node a health report packet, sent from a node of the plurality of network nodes, wherein the health report packet is received and sent through the mesh network according to a superframe comprising one or more time slots and one or more channels, wherein the superframe designates links between two nodes of the mesh network for communication, wherein each link in the superframe is designated at a predetermined time slot and a predetermined channel, and wherein the superframe repeats in a continuous cycle, and wherein the health report packet comprises node information including battery information, path information, and neighbor information;
   determining in the manager node if a management action is required based at least in part on the battery information in the received health report packet, by:
      calculating an expected battery lifetime based on the received battery information;
      determining if the expected battery lifetime is below a prescribed period-of-time threshold; and
      in the event that the expected lifetime is below the prescribed period-of-time threshold, determining that management action is required; and
   upon determining that management action is required, performing the management action wherein the management action is determined based at least in part on information in the health report packet,
   wherein the management action includes changing a configuration of the superframe to reduce battery use by the node from which the health report packet is received.

2. The method of claim 1, wherein:
   the receiving the health report packet comprises receiving the health report packet, sent from a particular node of the plurality of network nodes, comprising node information regarding the particular node having sent the health report packet and comprising neighbor information regarding at least one neighbor network node to the particular node having sent the health report packet, and
   the determining if the management action is required further comprises determining if the management action is required based at least in part on the received node information and the received neighbor information.

3. The method of claim 1, wherein the expected battery lifetime is calculated based on the received battery information and on at least one of:
   temperature information received in the health report packet;
   a number of links to and from the node from which the health report packet is received; and
   a battery voltage versus expected battery lifetime characteristic.

4. A system for self managing a mesh network including a manager node and a plurality of network nodes, the system comprising:
   a processor of the manager node configured to:
      receive in the manager node a health report packet, sent from a node of the plurality of network nodes, wherein the health report packet is received and sent through the mesh network according to a superframe comprising one or more time slots and one or more channels, wherein the superframe designates links between two nodes of the mesh network for communication, wherein each link in the superframe is designated at a predetermined time slot and a predetermined channel, and wherein the superframe repeats in a continuous cycle, and wherein the health report packet comprises node information including battery information, path information, and neighbor information;
      determine in the manager node if a management action is required based at least in part on the battery information in the received health report packet, by:
         calculating an expected battery lifetime based on the received battery information;
         determining if the expected battery lifetime is below a prescribed period-of-time threshold; and
         in the event that the expected lifetime is below the prescribed period-of-time threshold, determining that management action is required; and
      upon determining that management action is required, perform the management action wherein the management action is determined based at least in part on information in the health report packet; and
   a memory of the manager node coupled to the processor and configured to store instruction for the processor,
   wherein the management action includes changing a configuration of the superframe to reduce battery use by the node from which the health report packet is received.

5. A system as in claim 4, wherein the health report packet includes temperature information, and wherein the expected battery lifetime is calculated based on the received battery information and on the received temperature information.

6. A system as in claim 4, wherein the health report packet includes at least one of transmit, receive, and queue information.

7. A system as in claim 4, wherein the expected battery lifetime is calculated based on the received battery information and based on a number of links to and from the node from which the health report packet is received.

8. A system as in claim 4, wherein the management action includes issuing a battery warning.

9. A system as in claim 4, wherein the management action includes one or more of the following: lowering a number of transmit windows, lowering a number of receive windows, or lowering a frequency of making a measurement.

10. A system as in claim 4, wherein determining if the management action is required further includes:
   calculating a network statistic;
   determining if it is time to display the network statistic;
   in the event that it is time to display the network statistic, indicating management action is required.

11. A system as in claim 10, wherein the management action includes issuing a status report.

12. A system as in claim 4, wherein determining if the management action is required further includes:
   calculating a network statistic;
   determining if the network statistic indicates a network problem;
   in the event that the network statistic indicates a network problem, indicating management action is required.

13. A system as in claim 12, wherein the management action is required for addressing a network problem of transmit or receive failures above a prescribed threshold.

14. A system as in claim 12, wherein the management action is required for addressing a network problem of queue latency or queue length above a prescribed threshold.

15. A system as in claim 12, wherein the management action is required for addressing a network problem of signal strength below a prescribed threshold, or for addressing a network problem of the network not being optimized.

16. A system as in claim 12, wherein the management action comprises issuing a network problem warning or changing network organization.

17. A system as in claim 12, wherein the management action comprises changing network organization, wherein changing network organization comprises one or more of the following: changing node connectivity so paths that are not operating well are not used, creating a path, adding a node, adding a link, or deleting a link.

18. A system as in claim 12, wherein the management action comprises changing a network node parameter.

19. A system as in claim 4, wherein determining if the management action is required further includes:
  determining if information is received about a new network node;
  in the event that information is received about the new network node, indicating management action is required.

20. A system as in claim 19, wherein the management action includes activating the new network node.

21. The system of claim 4, wherein:
  the processor is configured to receive the health report packet, sent from a particular node of the plurality of network nodes, comprising node information regarding the particular node having sent the health report packet and comprising neighbor information regarding at least one neighbor network node to the particular node having sent the health report packet, and
  the processor is further configured to determine if the management action is required based at least in part on the received node information and the received neighbor information.

22. A system as in claim 4, wherein the expected battery lifetime is calculated based on a battery voltage used to determine the expected battery lifetime according to a battery voltage versus expected battery lifetime characteristic.

23. A computer program product for self managing a mesh network including a manager node and a plurality of network nodes, the computer program product being embodied in a non-transitory computer readable storage medium and comprising computer instructions for:
  receiving in the manager node a health report packet, sent from a node of the plurality of network nodes, wherein the health report packet is received and sent through the mesh network according to a superframe comprising one or more time slots and one or more channels, wherein the superframe designates links between two nodes of the mesh network for communication, wherein each link in the superframe is designated at a predetermined time slot and a predetermined channel, and wherein the superframe repeats in a continuous cycle, and wherein the health report packet comprises node information including battery information, path information and neighbor information;
  determining in the manager node if a management action is required based at least in part on the battery information in the received health report packet, by:
    calculating an expected battery lifetime based on the received battery information;
    determining if the expected battery lifetime is below a prescribed period-of-time threshold; and
    in the event that the expected lifetime is below the prescribed period-of-time threshold, determining that management action is required; and
    upon determining that management action is required, performing the management action wherein the management action is determined based at least in part on information in the first health report packet,
  wherein the management action includes changing a configuration of the superframe to reduce battery use by the node from which the health report packet is received.

24. The computer program product of claim 23, wherein:
  the receiving the health report packet comprises receiving the health report packet, sent from a particular node of the plurality of network nodes, comprising node information regarding the particular node having sent the health report packet and comprising neighbor information regarding at least one neighbor network node to the particular node having sent the health report packet, and
  the determining if the management action is required further comprises determining if the management action is required based at least in part on the received node information and the received neighbor information.

25. The computer program product of claim 23, wherein the expected battery lifetime is calculated based on the received battery information and on at least one of:
  temperature information received in the health report packet;
  a number of links to and from the node from which the health report packet is received; and
  a battery voltage versus expected battery lifetime characteristic.

26. A method for self managing a mesh network including a manager node and a plurality of network nodes, the method comprising:
  receiving in the manager node a first health report packet sent from a first node of the plurality of network nodes, wherein the first health report packet is received and sent through the mesh network according to a superframe comprising one or more time slots and one or more channels, wherein the superframe designates links between two nodes of the mesh network for communication, wherein each link in the superframe is designated at a predetermined time slot and a predetermined channel, and wherein the superframe repeats in a continuous cycle, and wherein the first health report packet comprises node information including battery information, path information, and neighbor information;
  receiving in the manager node a second health report packet which includes node information including battery information, wherein the second health report packet is received and sent through the mesh network according to the superframe;
  determining in the manager node if a management action is required based at least in part on the battery information in the received first health report packet or the received second health report packet, by:
    calculating first and second expected battery lifetimes respectively based on the battery information in the received first and second health report packets;
    determining if either of the first and second expected battery lifetimes is below a prescribed period-of-time threshold; and in the event that either of the first and second expected battery lifetimes is below the prescribed period-of-time threshold, determining that management action is required; and upon determining that management action is required, performing the management action wherein the management action is determined based at least in part on information in the first health report packet and the second health report packet, wherein the management action comprises changing routing on at least one route, and wherein the changing routing on at least one route includes changing a configuration of the superframe to reduce battery use by at least one of the nodes from which the first and second health report packets are received.

27. The method of claim 26, wherein:

the receiving the first health report packet comprises receiving the first health report packet, sent from a first node of the plurality of network nodes, comprising node information regarding the first node having sent the first health report packet and comprising first neighbor information regarding at least one neighbor network node to the first node having sent the first health report packet, the receiving the second health report packet comprises receiving the second health report packet, sent from a second node of the plurality of network nodes, comprising node information regarding the second node having sent the second health report packet and comprising second neighbor information regarding at least one neighbor network node to the second node having sent the second health report packet, and the determining if the management action is required further comprises determining if the management action is required based at least in part on the received first and second node information and the received first and second neighbor information.

28. The method of claim 26, wherein the expected battery lifetime is calculated based on the received battery information and on at least one of:

temperature information received in at least one of the first and second health report packets;

a number of links to and from at least one of the nodes from which the first and second health report packets are received; and a battery voltage versus expected battery lifetime characteristic.

* * * * *